US00RE46267E

(19) United States
(12) Reissued Patent
Kim

(10) Patent Number: US RE46,267 E
(45) Date of Reissued Patent: Jan. 10, 2017

(54) TERMINAL FOR WIRELESS COMMUNICATION

(71) Applicant: Samsung Electronics Co., Ltd., Suwon-Si (KR)

(72) Inventor: Dong-Kyun Kim, Seoul (KR)

(73) Assignee: Samsung Electronics Co., Ltd., Suwon-si (KR)

(21) Appl. No.: 29/508,182

(22) Filed: Nov. 4, 2014

Related U.S. Patent Documents

Reissue of:
(64) Patent No.: Des. 685,774
Issued: Jul. 9, 2013
Appl. No.: 29/425,665
Filed: Jun. 26, 2012

(30) Foreign Application Priority Data

Jan. 13, 2012 (KR) ..... 30-2012-0001869

(51) LOC (10) Cl. ..... 14-03
(52) U.S. Cl.
USPC ..... D14/240; D14/358
(58) Field of Classification Search
USPC ..... D14/371–376, 125–130, 336, 337, 341,D14/217, 142, 239, 240, 434, 238.1; D6/308, D6/311; 361/679.08, 679.23; 349/1, 2, 11, 58; 345/104, 156, 173, 174; 341/12; 248/917–924, 371
(Continued)

(56) References Cited

U.S. PATENT DOCUMENTS

D383,131 S * 9/1997 Biasotti et al. ..... D14/149
D432,105 S * 10/2000 Hyun ..... D14/138 AB
(Continued)

*Primary Examiner* — Darlington Ly

(74) *Attorney, Agent, or Firm* — NSIP Law

(57) CLAIM

The ornamental design for a terminal for wireless communication, as shown and described.

DESCRIPTION

*Notice: more than one reissue application has been filed for the reissue of U.S. Pat. No. D685,774.*

FIG. 1 is a front perspective view of a terminal for wireless communication *showing my new design*;
FIG. 2 is a front view [of the terminal for wireless communication of FIG. 1] *thereof*;
FIG. 3 is a rear view [of the terminal for wireless communication of FIG. 1] *thereof*;
FIG. 4 is a left-side view [of the terminal for wireless communication of FIG. 1] *thereof*;
FIG. 5 is a right-side view [of the terminal for wireless communication of FIG. 1] *thereof*;
FIG. 6 is a top plan view [of the terminal for wireless communication of FIG. 1] *thereof*;
FIG. 7 is a bottom plan view [of the terminal for wireless communication of FIG. 1] *thereof*;
FIG. 8 is a rear perspective view [of the terminal for wireless communication of FIG. 1] *thereof*; and,
FIG. 9 is a rear view of the terminal for wireless communication of FIG. 1 [illustrating an example of how the terminal for wireless communication of FIG. 1 may be docked to] *in which* a tablet PC *shown in broken lines is provided to illustrate an example environment*.
[Features shown in broken lines in FIG. 9 form no part of the claimed design.]
*The broken lines in the figures show portions of the terminal for wireless communication which form no part of the claimed design.*

1 Claim, 7 Drawing Sheets

Matter enclosed in heavy brackets [ ] appears in the original patent but forms no part of this reissue; matter printed in italics indicates the additions made by reissue.

(Amended)

(58) Field of Classification Search
CPC ..... F16M 11/08; F16M 11/22; F16M 2200/08
See application file for complete search history.

(56) References Cited

U.S. PATENT DOCUMENTS

| | | | | | |
|---|---|---|---|---|---|
| D439,571 | S | * | 3/2001 | Hyun | D14/138 AB |
| D480,058 | S | * | 9/2003 | Chin | D14/138 AB |
| D514,590 | S | * | 2/2006 | Naruki | D14/203.3 |
| D551,644 | S | * | 9/2007 | Kim et al. | D14/138 AB |
| D558,763 | S | * | 1/2008 | Morganstern et al. | D14/480.7 |
| D565,018 | S | * | 3/2008 | Arbisi | D14/138 AB |
| D579,906 | S | * | 11/2008 | Kim et al. | D14/138 AD |
| D582,367 | S | * | 12/2008 | Kim et al. | D14/138 AB |
| D619,981 | S | * | 7/2010 | Chuang | D14/138 R |
| D629,373 | S | * | 12/2010 | Kim et al. | D14/126 |
| D648,697 | S | * | 11/2011 | Castano | D14/138 AB |
| D669,070 | S | * | 10/2012 | Hsu et al. | D14/341 |
| D671,939 | S | * | 12/2012 | Chung | D14/374 |
| D675,196 | S | * | 1/2013 | Maddern | D14/240 |
| D677,181 | S | * | 3/2013 | Lenz et al. | D10/65 |
| 8,605,433 | B2 | * | 12/2013 | Chiang et al. | 361/679.59 |
| 8,606,340 | B2 | * | 12/2013 | Pegg | 455/575.4 |
| D701,570 | S | * | 3/2014 | Fletcher et al. | D19/113 |
| D701,862 | S | * | 4/2014 | Lee et al. | D14/420 |
| D702,231 | S | * | 4/2014 | Park et al. | D14/341 |
| D704,200 | S | * | 5/2014 | Rayner | D14/447 |
| D722,049 | S | * | 2/2015 | Moradian | D14/341 |
| 2006/0236014 | A1 | * | 10/2006 | Yin et al. | 710/303 |
| 2010/0309617 | A1 | * | 12/2010 | Wang et al. | 361/679.01 |

* cited by examiner

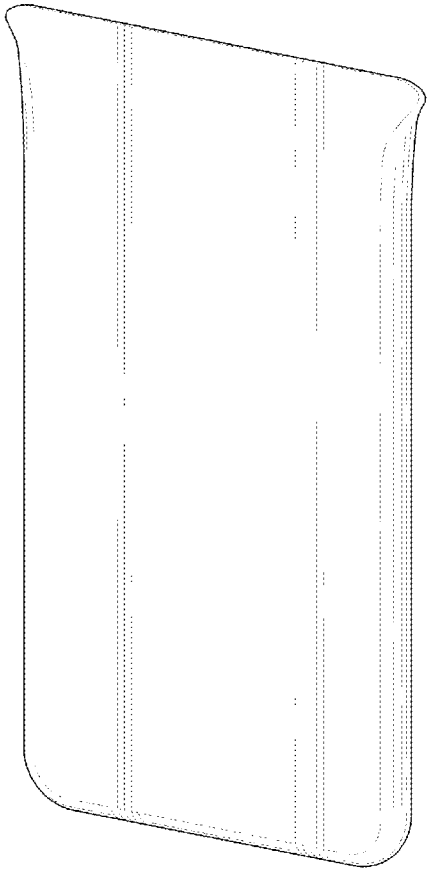
FIG. 1
(Amended)

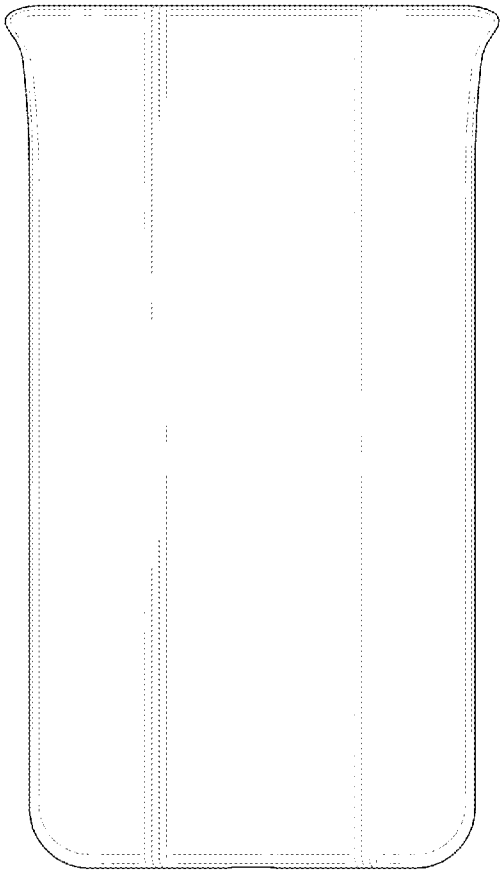
FIG. 2
(Amended)

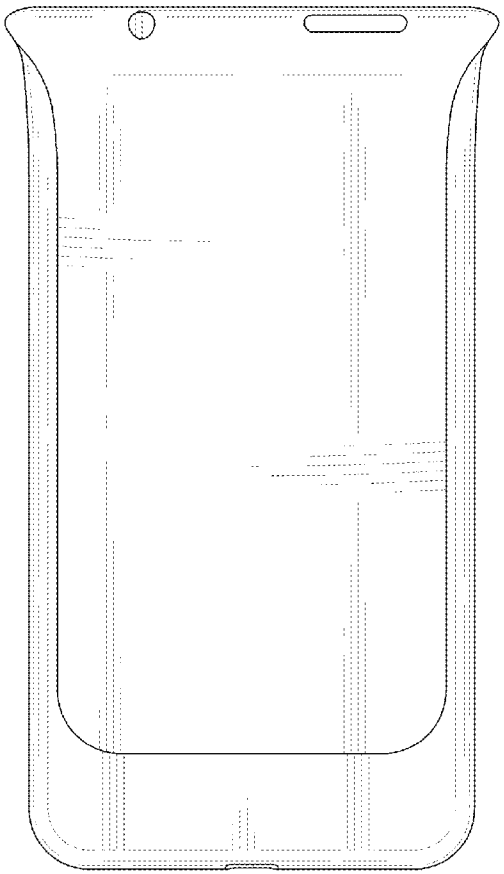
FIG. 3
(Amended)

FIG. 5
(Amended)
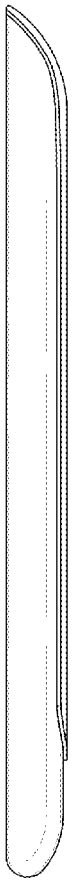
FIG. 4
(Amended)
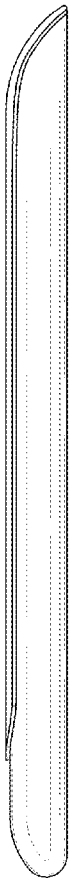

FIG. 6
(Amended)
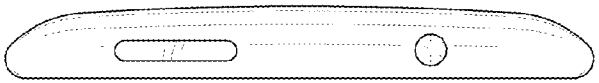
FIG. 7
(Amended)
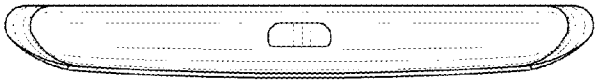

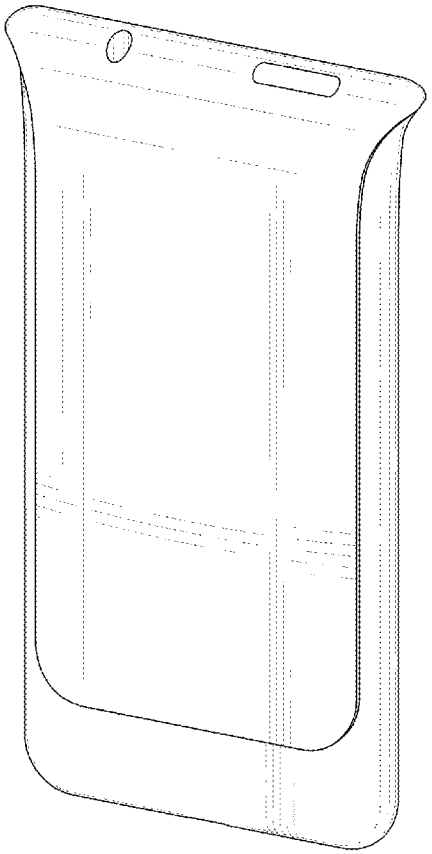
FIG. 8
(Amended)

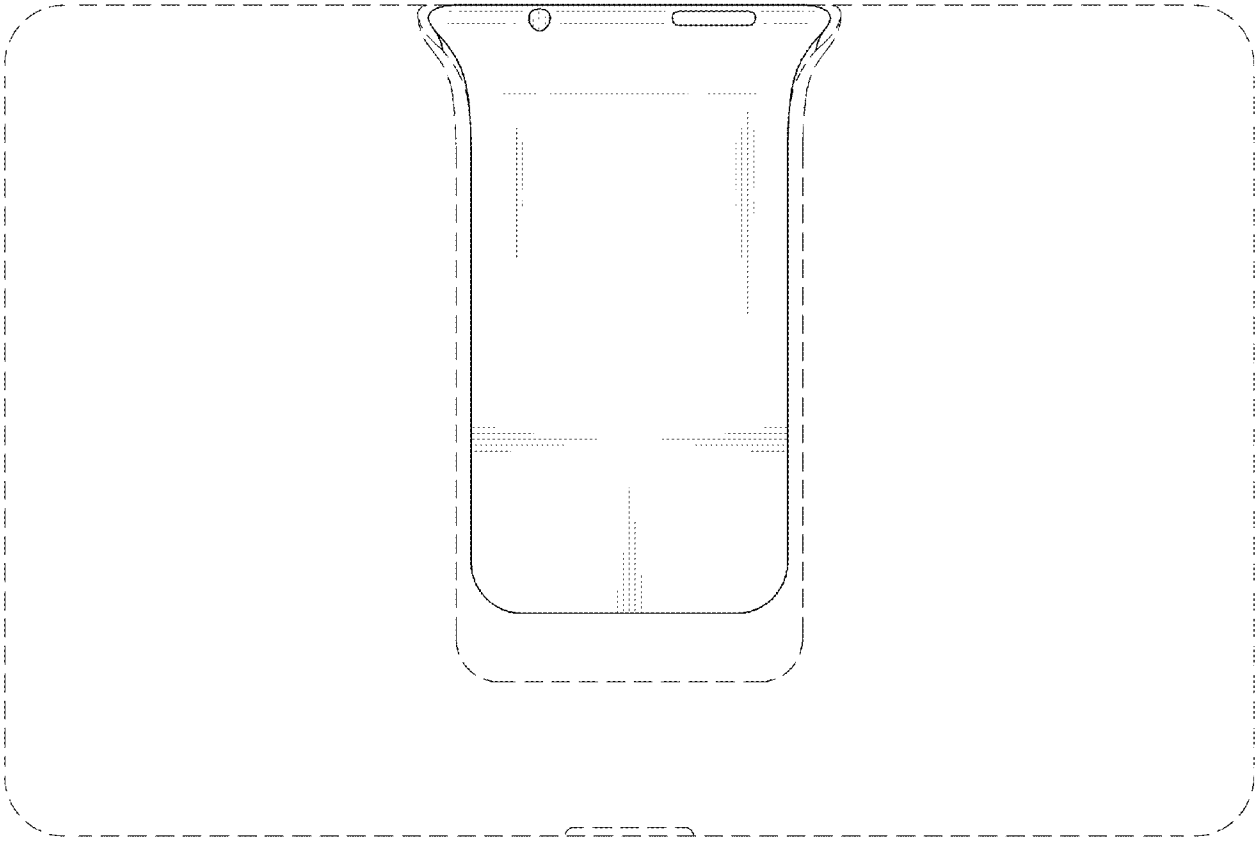
FIG. 9
(Amended)